(No Model.)
H. YOUNG.
ART OF SAWING STONE.
No. 364,459. Patented June 7, 1887.
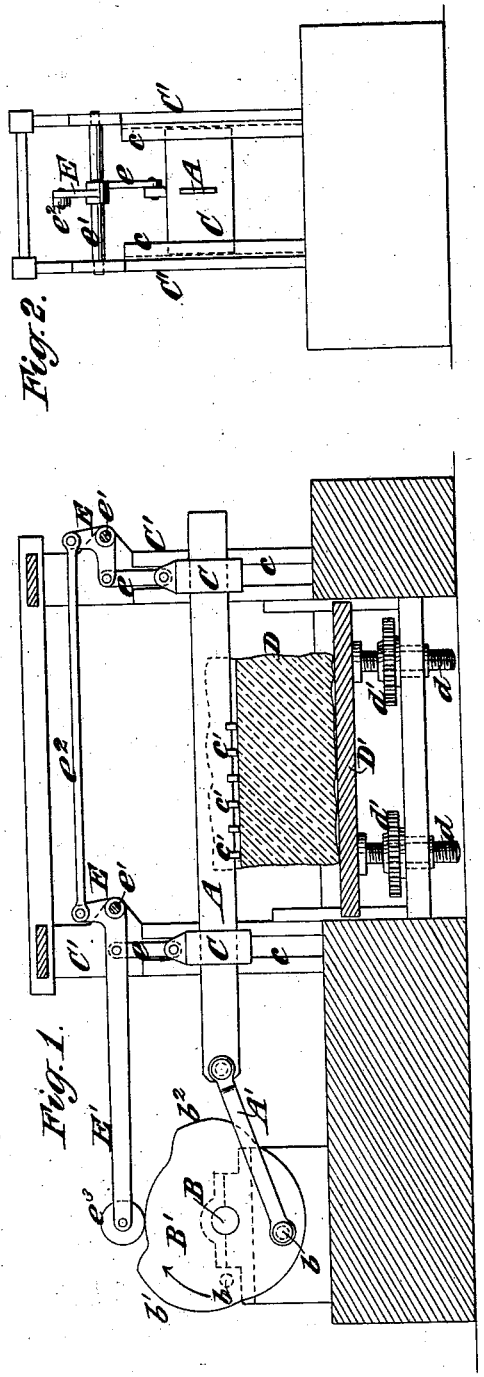
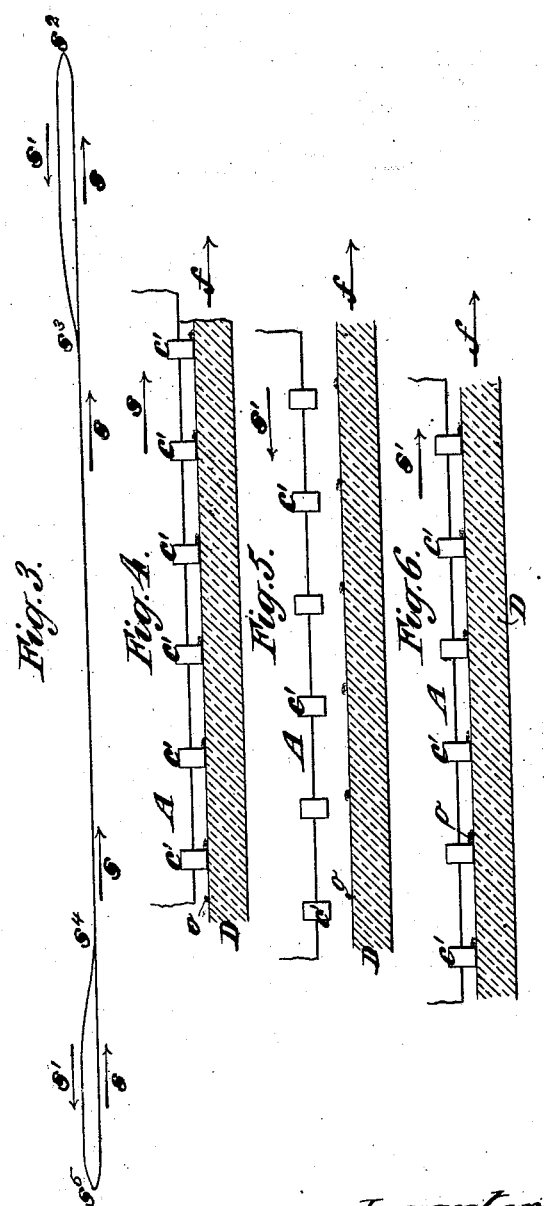
Witnesses:
O. L. Sundgren
Emil Herter
Inventor:
Hugh Young
by his attys
Brown & Hall

UNITED STATES PATENT OFFICE.

HUGH YOUNG, OF NEW YORK, N. Y.

ART OF SAWING STONE.

SPECIFICATION forming part of Letters Patent No. 364,459, dated June 7, 1887.

Application filed March 9, 1887. Serial No. 230,204. (No model.)

*To all whom it may concern:*

Be it known that I, HUGH YOUNG, of the city and county of New York, in the State of New York, have invented a new and useful Improvement in the Art of Sawing Stone by a Reciprocating Series of Cutting-Tools, of which the following is a specification.

My invention is an improvement in the art of sawing stone which involves the employment of a series of tools armed with diamonds or other hard stones and secured in fixed relation to each other in a reciprocating blade or bar which is moved in the line of the cut to be made. When the tools are maintained in working-contact with the stone during their entire or equal movement in both directions, the débris is simply moved by the tools backward and forward in the kerf, and neither the débris nor any diamonds which may become freed from the tools have imparted to them any progressive movement toward the end of the kerf.

In my application for Letters Patent, Serial No. 227,071, filed February 9, 1887, I have described and claimed an improvement in the art of sawing stone by a reciprocating series of cutting-tools secured in fixed relation to each other, and which consists in maintaining the tools in working-contact with the stone throughout a less length of movement in one direction than in the other, whereby each tool, during the portion of its reciprocating movement which is performed while it is out of working-contact, is caused to vault over and come behind the débris formed by the previous cut. By such an operation of the series of cutting-tools the débris and any loose diamonds which may be in the kerf are advanced step by step from one end of the stone toward the other, and are delivered at the end of the stone, thereby keeping the kerf comparatively clear and preventing any diamonds which may become loose from being injured themselves or from injuring or tearing other diamonds from their settings.

According to my aforesaid application, the series of cutting-tools are lifted or maintained out of contact at one end only of their movement—that is to say, in each double movement or double reciprocation of the series of tools they are caused to vault over and come behind the débris, as above described, only once, and the débris and any loose diamonds in the kerf are advanced only one step, usually the distance between two of the tools, at each double reciprocation or revolution of the saw. I have now discovered that greatly-improved results may be obtained by maintaining the series of cutting-tools out of contact with the stone during both the first and terminal portions of their movement in one direction, so that the series of cutting-tools will be caused to vault over and come behind the débris twice during each complete revolution of the saw, thereby producing a more rapid movement of the débris toward the end of the stone at which it is delivered.

My present invention, therefore, consists in maintaining the tools in cutting-contact with the stone during substantially the whole length of their movement in one direction and maintaining them out of cutting-contact during both the first and terminal portions of their movement in the other direction, whereby, during the first and terminal portions of their movement in one direction, the tools are caused to vault over and come behind the débris in the kerf, in order that they may, during their movement in the other direction, advance the débris in the kerf.

In the accompanying drawings, Figure 1 is a sectional elevation of a machine embodying my invention. Fig. 2 is an end view thereof. Fig. 3 is a diagram illustrating the line of travel of the series of cutting-tools and of each tool of the series; and Figs. 4, 5, and 6 are diagrams showing a series of cutting-tools and the stone on which they act, and which serve to illustrate my invention.

Similar letters of reference designate corresponding parts in all the figures.

A designates the blade, which is reciprocated by any suitable mechanism—as, for example, by a connecting-rod, A', driven by a crank upon a shaft, B. As here represented, the crank B' also forms a cam, the purpose of which is hereinafter described, and has fixed in it the crank-pin b, to which the connecting-rod A' is jointed. The saw-blade A is arranged to reciprocate in guides or bearers C, which are fitted to suitable slides or guideways, c, in a main stationary frame, C', and the saw-blade A is armed at its edge with cutting-tools c', in which are fixed diamonds, borts, or other hard stones.

D designates the stone on which the series of reciprocating cutters $c'$ act, and which is mounted upon a bed or platform, D'. As the cutting progresses the saw-blade A and the stone D must be moved one relatively to the other, in order to advance or feed the saw to the stone; and in this example of my invention the feeding operation is effected by raising the platform or bed D'. Any suitable mechanism may be employed for the purpose, and, as here represented, I have shown screws $d$ and nuts $d'$, which are constructed to form ratchet-wheels, and by the rotation of which the stone may be raised to the series of cutting-tools $c'$. In the absence of any other mechanism than that described operating upon the blade it is obvious that the blade would be reciprocated backward and forward always in the same plane, and the cutting-tools $c'$ would be maintained in cutting-contact with the stone throughout the entire length of movement in both directions. This, however, would result in the débris simply being moved back and forth in the kerf, entailing useless wear or destruction of the diamonds, and in any lost diamonds being moved similarly back and forth to their own detriment and the possible breaking or tearing of the other diamonds from the tools in which they are set. To prevent this, I separate the series of cutting-tools and the stones from working-contact at each end of the reciprocating movement and cause the series of cutting-tools when performing both the first and terminal portions of their movement in one direction to be maintained out of cutting-contact with the stone, so that each of the cutting-tools will be caused to vault over and come behind the débris produced by the previous cut.

In Fig. 3 I have illustrated by a simple diagram the line of movement in which the series of cutting-tools, and in which each of said tools, operates, and I have shown by arrows the direction of such movement. While the series of cutting-tools are moving in the direction of the arrows $s$ in Fig. 3, they are maintained in cutting-contact with the stone throughout substantially the entire length of their movement; but during the movement of the cutting-tools in the direction of the arrows $s'$ they are maintained for a portion of the time out of contact with the stone, and this separation of the cutting-tools and stone in this example of my invention is produced by slightly lifting the blade A, as I shall soon describe. As the series of cutting-tools $c'$ about complete their movement in the direction of the arrows $s$, they are lifted from the stone, and during the first portion of their movement in the direction of the arrows $s'$, and while they are moving from $s^2$ to $s^3$, the series of cutting-tools are maintained out of contact with the stone, and are caused to vault over and come behind the débris left in the kerf at the previous cut. During the middle portion of the movement of the series of cutting-tools in the direction indicated by the arrows $s'$, and while they are moving from the point $s^3$ to $s^4$, the tools are maintained in cutting-contact with the stone; but at the point $s^4$ the contact between the tools and the stone is again broken, in this instance also by lifting the blade A, and the series of tools are maintained out of cutting-contact with the stone while they perform the terminal portion of their movement in the direction of the arrows $s'$, which is while they are moving from the point $s^4$ to $s^5$. At the point $s^5$ the direction of movement of the series of cutting-tools is reversed again, and they are brought into contact with the stone preparatory to making their movement in the direction indicated by the arrows $s$ in Fig. 3.

I have here shown, for purposes of illustration, one simple form of mechanism, which may be employed for producing the lift of the blade A at the points $s^2$ and $s^4$ on the diagram shown in Fig. 3. The blade bearers or guides C may rise and fall slightly in the guideways $c$, and are hung from links $e$, which are in turn hung from bell-crank levers E, fulcrumed at $e'$, and having upwardly projecting arms connected by a rod, $e^2$. One of the bell-crank levers E has its horizontally-extending arm prolonged, as shown at E', and provided with a truck-roll, $e^3$, which bears upon the periphery of the cam B'. This cam has projections $b'$ $b^2$. The projection $b'$ produces the lift of the blade while moving from $s^4$ to $s^5$ in the direction of the arrows $s'$, and the projection $b^2$ produces the lift of the blade while moving from $s^2$ to $s^3$ in the direction of the arrows $s'$. The crank and cam B' rotate in the direction of the arrows shown thereon in Fig. 1, and in the position of parts shown in Fig. 1 the blade is moving in the direction indicated by the arrows $s'$, Fig. 3, and each of the several cutters or cutting-tools $c'$ has nearly reached the position in the length of its movement indicated by $s^4$ in Fig. 3. As soon as the projection $b'$ strikes the truck-roller $e^3$, which it will do at the point $s^4$, the mechanism operated upon by the cam will be actuated so as to lift the blade A and to maintain it lifted while the crank-pin moves to its dead-center, or to the position represented by dotted lines in Fig. 1, which brings the the series of cutting-tools and each one of said tools to the position shown at $s^5$. The concentric portion of the cam B', just behind the projection $b'$, then reaches the truck-roller $e^3$, and the blade is allowed to descend slightly, bringing the cutting-tools again into contact, where they are maintained during substantially the entire length of movement of the cutting-tools in the direction of the arrows $s$. As the blade completes its movement in the direction of the arrows $s$, the projection $b^2$ on the cam comes to the truck-roller $e^3$, and the blade is lifted to maintain the cutting-tools out of contact with the stone while they are moved from $s^2$ to $s^3$.

In the diagram, Fig. 4, I have represented the position of the cutting-tools $c'$ relatively to the stone D just as they complete their movement in the direction of the arrows $s$, and as they are about to reach the point $s^2$ and be lifted, and it will be observed that a diamond, o, has become detached from the cutting-tool c' at the left-hand end of the series and has been left in the kerf.

In Fig. 5 I have represented the position of the series of cutting-tools and the stone while they are maintained out of contact—that is, while they are moving in the direction of the arrow s' from $s^2$ to $s^3$ of Fig. 3—and it will be seen that during this first portion of their movement in the direction of the arrow s' the left-hand cutting-tool c' will be caused to pass to the left over the diamond o, and in the same manner each of the cutting-tools will vault over and come behind the débris formed by the previous cut.

In the diagram in Fig. 6 I have represented the position of the blade after it has completed its movement in the direction of the arrows s' and is commencing its movement in the direction of the arrows s, and it will be understood that in the terminal portion of their movement in the direction of the arrows s', and while moving from $s^4$ to $s^5$, the next to the last cutting-tool c' at the left-hand end of the series will have vaulted over and come behind the loose diamond o, and in a like manner each of the cutting-tools will have vaulted over and come behind the débris formed by their operation in the direction of the arrows s'.

From the above description it will be understood that twice during each complete revolution or double movement of the series of cutting-tools they will be caused to vault over and come behind the débris in the kerf, and at each double stroke or revolution the débris will be advanced in the direction of the arrows f in Figs. 4, 5, and 6, and will be finally delivered at the end of the stone.

I do not claim herein the improvement in the art of sawing stone by a reciprocating series of cutting-tools arranged in fixed relation to each other, consisting in maintaining the tools in working contact with the stone throughout a less length of movement in one direction than in the other, whereby each tool, during the portion of its reciprocating movement which is performed while out of contact, is caused to vault over and come behind the débris formed by the previous cut; nor do I claim such improvement when the difference in the length of working-contact is substantially equal to the distance between two tools in a series, as such improvement forms the subject of my pending application, Serial No. 227,071, filed February 9, 1887.

What I claim as my invention, and desire to secure by Letters Patent, is—

The improvement in the art of sawing stone by a reciprocating series of cutting-tools arranged in fixed relation to each other, consisting in maintaining the tools in cutting-contact with the stone during substantially the whole length of their movement in one direction, and maintaining them out of cutting-contact during both the first and terminal portions of their movement in the other direction, whereby, during the first and terminal portions of their movement in one direction, the tools are caused to vault over and come behind the débris in the kerf, in order that they may, during their movement in the other direction, advance the débris in the kerf, substantially as herein described.

HUGH YOUNG.

Witnesses:
C. HALL,
FREDK. HAYNES.